(12) United States Patent
Elul et al.

(10) Patent No.: US 12,445,431 B2
(45) Date of Patent: Oct. 14, 2025

(54) SYSTEM AND METHOD FOR PROVIDING RDP CLIENT BASED RDP SERVICES THROUGH A ZERO TRUST CLOUD ENVIRONMENT

(71) Applicant: HEWLETT PACKARD ENTERPRISE DEVELOPMENT LP, Spring, TX (US)

(72) Inventors: Natan Elul, Tel Aviv (IL); Shachar Dekel, Tel Aviv (IL); Gil Azrielant, Tel Aviv (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 176 days.

(21) Appl. No.: 18/359,506

(22) Filed: Jul. 26, 2023

(65) Prior Publication Data

US 2023/0388296 A1    Nov. 30, 2023

Related U.S. Application Data

(63) Continuation-in-part of application No. 17/654,309, filed on Mar. 10, 2022.

(51) Int. Cl.
*H04L 9/40* (2022.01)
*H04L 67/141* (2022.01)

(52) U.S. Cl.
CPC ............ *H04L 63/083* (2013.01); *H04L 63/20* (2013.01); *H04L 67/141* (2013.01)

(58) Field of Classification Search
CPC ..... H04L 63/083; H04L 63/20; H04L 67/141; H04L 63/0861; H04L 63/107; H04L 67/1008; H04L 2463/082
See application file for complete search history.

(56) References Cited

U.S. PATENT DOCUMENTS

| | | |
|---|---|---|
| 9,148,405 B2 | 9/2015 | Narendra et al. |
| 11,240,242 B1 | 2/2022 | Celik |
| 11,444,925 B1 | 9/2022 | Patimer et al. |
| 11,470,100 B1 | 10/2022 | Christian |
| 11,716,312 B1 | 8/2023 | McNamara, Jr. |
| 12,184,696 B2 | 12/2024 | Subbanna et al. |
| 2010/0146611 A1 | 6/2010 | Kuzin et al. |
| 2015/0382195 A1 | 12/2015 | Grim et al. |
| 2017/0331832 A1 | 11/2017 | Lander et al. |
| 2018/0295137 A1 | 10/2018 | Zager et al. |
| 2019/0068578 A1 | 2/2019 | Balakrishnan et al. |
| 2019/0081942 A1 | 3/2019 | Suresh |

(Continued)

OTHER PUBLICATIONS

International Search Report for PCT Application PCT/IB2023/052327 dated Jun. 13, 2023. The International Bureau of WIPO.

(Continued)

*Primary Examiner* — Kristie D Shingles
(74) *Attorney, Agent, or Firm* — Hewlett Packard Enterprise Patent Department (57) ABSTRACT

Remote desktop protocol (RDP) is a proprietary protocol for controlling machines over a network. In order to overcome certain deficiencies of the protocol a method is disclosed utilized in a zero trust cloud environment, to provide access to a pool of RDP servers, via an RDP client or via a web based interface while simultaneously providing an authenticated and secure policy based experience.

23 Claims, 5 Drawing Sheets

(56) References Cited

U.S. PATENT DOCUMENTS

| | | |
|---|---|---|
| 2019/0141015 A1 | 5/2019 | Nellen |
| 2020/0236112 A1 | 7/2020 | Pularikkal et al. |
| 2020/0336466 A1 | 10/2020 | Goldschlag et al. |
| 2021/0092200 A1 | 3/2021 | Chauhan et al. |
| 2021/0136041 A1 | 5/2021 | Foxhoven et al. |
| 2021/0250333 A1* | 8/2021 | Negrea ............... H04L 63/0876 |
| 2022/0075889 A1 | 3/2022 | Friedman |
| 2022/0353244 A1* | 11/2022 | Kahn ...................... H04L 67/12 |
| 2023/0123781 A1 | 4/2023 | Kaimal et al. |
| 2023/0164183 A1* | 5/2023 | Kothari ............... H04L 63/1416 |
| | | 726/23 |
| 2023/0224167 A1 | 7/2023 | Wang et al. |
| 2023/0291726 A1 | 9/2023 | Dekel et al. |
| 2023/0370495 A1 | 11/2023 | Desai et al. |
| 2023/0412638 A1* | 12/2023 | Dogaru ............... H04L 63/0236 |
| 2024/0121211 A1 | 4/2024 | Bhatia et al. |
| 2024/0129338 A1* | 4/2024 | Azad ................... H04L 63/1425 |

OTHER PUBLICATIONS

Written Opinion of the International Searching Authority for PCT Application PCT/IB2023/052327 dated Jun. 13, 2023. The International Bureau of WIPO.

\* cited by examiner

SYSTEM AND METHOD FOR PROVIDING RDP CLIENT BASED RDP SERVICES THROUGH A ZERO TRUST CLOUD ENVIRONMENT

CROSS-REFERENCE TO RELATED APPLICATIONS

This application is a continuation-in-part of U.S. Non-Provisional patent application Ser. No. 17/654,309 filed on Mar. 10, 2022, the contents of which are hereby incorporated by reference.

TECHNICAL FIELD

The present disclosure relates generally to remote desktop access, and particularly improved techniques for providing remote desktop access.

BACKGROUND

Remote desktop protocol (RDP) is a communication protocol for controlling another machine over a network connection. A client running client software (or in some instances web interface) connects to a server running server software, which allows the client to control the server. RDP is a proprietary protocol developed by Microsoft® and is widely in use in network and cloud environments.

As is often with proprietary protocols, customizing the protocol for a user's needs is not often straightforward. Further, certain functionalities may be totally absent, leaving a user to either find a workaround, look for an alternative solution, or simply wait until such time as the owner of the proprietary protocol decides to produce a new version.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, client-based method may include receiving a request based on an user account to connect to a zero trust cloud environment. Client-based method may also include verifying an identity of the user account, the user account utilized by a client device. Method may furthermore include initiating a first RDP session between the client device and a frontend RDP server of the zero trust cloud environment, where the frontend RDP server is configured to direct data received from the client device to a virtual workload. Method may in addition include capturing through the virtual workload login credentials from the client device, where the login credentials are for a target server deployed in a secure network environment. Method may moreover include authenticating the captured login credentials with the target server. Method may also include sending the client device a reconnect instruction, which when executed by the client device configure the client device to reconnect to the frontend RDP server, in response to determining that the captured login information is authenticated by the target server. Other embodiments of this aspect include corresponding computer systems, apparatus, and computer programs recorded on one or more computer storage devices, each configured to perform the actions of the methods.

Implementations may include one or more of the following features. Method may include: receiving a communication from the client device; and directing the communication to the target server. Method may include: receiving a response to the communication from the target server; and directing the response to the client device. Method may include: configuring the virtual workload to initiate a browser session, where the browser session is directed to a webpage generated by an access portal server; and capturing the login credentials from the generated webpage. Method may include: generating an RDP session file for the client device, where the RDP session file includes an identifier of the target server. Method may include: monitoring communication between the client device and the target server. Method may include: reading a data packet transferred in the communication between the client device and the target server. Method where the virtual workload is an XRDP container. Method may include: configuring the client device to execute an RDP client software program. Method where the zero trust cloud environment includes any one of: an access portal server, the virtual workload, a backend server, and any combination thereof. Method where the backend server is configured to connect to a connector deployed in the secure network environment. Implementations of the described techniques may include hardware, a method or process, or a computer tangible medium.

In one general aspect, non-transitory computer-readable medium may include one or more instructions that, when executed by one or more processors of a device, cause the device to: receive a request based on an user account to connect to a zero trust cloud environment. Medium may furthermore verify an identity of the user account, the user account utilized by a client device. Medium may in addition initiate a first RDP session between the client device and a frontend RDP server of the zero trust cloud environment, where the frontend RDP server is configured to direct data received from the client device to a virtual workload. Medium may moreover capture through the virtual workload login credentials from the client device, where the login credentials are for a target server deployed in a secure network environment. Medium may also authenticate the captured login credentials with the target server. Medium may furthermore send the client device a reconnect instruction, which when executed by the client device configure the client device to reconnect to the frontend RDP server, in response to determining that the captured login information is authenticated by the target server. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: receive a request based on an user account to connect to a zero trust cloud environment. System may in addition verify an identity of the user account, the user account utilized by a client device. System may moreover initiate a first RDP session between the client device and a frontend RDP server of the zero trust cloud environment, where the frontend RDP server is configured to direct data received from the client device to a virtual workload. System may also capture through the virtual workload login credentials from the client device, where the login credentials are for a target server deployed in a secure network environment. System may furthermore authenticate the captured login credentials with the target server. System may in addition send the client device a reconnect instruction, which when executed by the client device configure the client device to reconnect to the frontend RDP server, in response to determining that the captured login information is authenticated by the target server. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: receive a communication from the client device; and direct the communication to the target server. System where the memory contains further instructions which when executed by the processing circuitry further configure the system to: receive a response to the communication from the target server; and direct the response to the client device. System where the memory contains further instructions which when executed by the processing circuitry further configure the system to: configure the virtual workload to initiate a browser session, where the browser session is directed to a webpage generated by an access portal server; and capture the login credentials from the generated webpage. System where the memory contains further instructions which when executed by the processing circuitry further configure the system to: generate an RDP session file for the client device, where the RDP session file includes an identifier of the target server. System where the memory contains further instructions which when executed by the processing circuitry further configure the system to: monitor communication between the client device and the target server. System where the memory contains further instructions which when executed by the processing circuitry further configure the system to: read a data packet transferred in the communication between the client device and the target server. System where the virtual workload is an XRDP container. System where the memory contains further instructions which when executed by the processing circuitry further configure the system to: configure the client device to execute an RDP client software program. System where the zero trust cloud environment includes any one of: an access portal server, the virtual workload, a backend server, and any combination thereof. System where the backend server is configured to connect to a connector deployed in the secure network environment. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing a remote desktop protocol (RDP) session via a zero trust network to a client device having an RDP client installed thereon.

RDP is generally a protocol which does not support an entity in the middle of communication, and therefore there is no native support for a zero trust network between a client device and a server. In an embodiment, utilizing the zero trust cloud architecture described herein allows a client device to access a resource, such as a virtual machine, deployed in a secure network environment, while the connection is monitored, authenticated and verified by a zero trust network.

The ability to monitor, authenticate and verify a user account accessing a secure network via a remote client device is beneficial as it provides an additional layer of cybersecurity, which is a capability not natively supported by the proprietary RDP. Moreover, various forms of functionality can be implemented on top of this architecture to provide additional benefits for such a controlled access environment.

Figure 1:
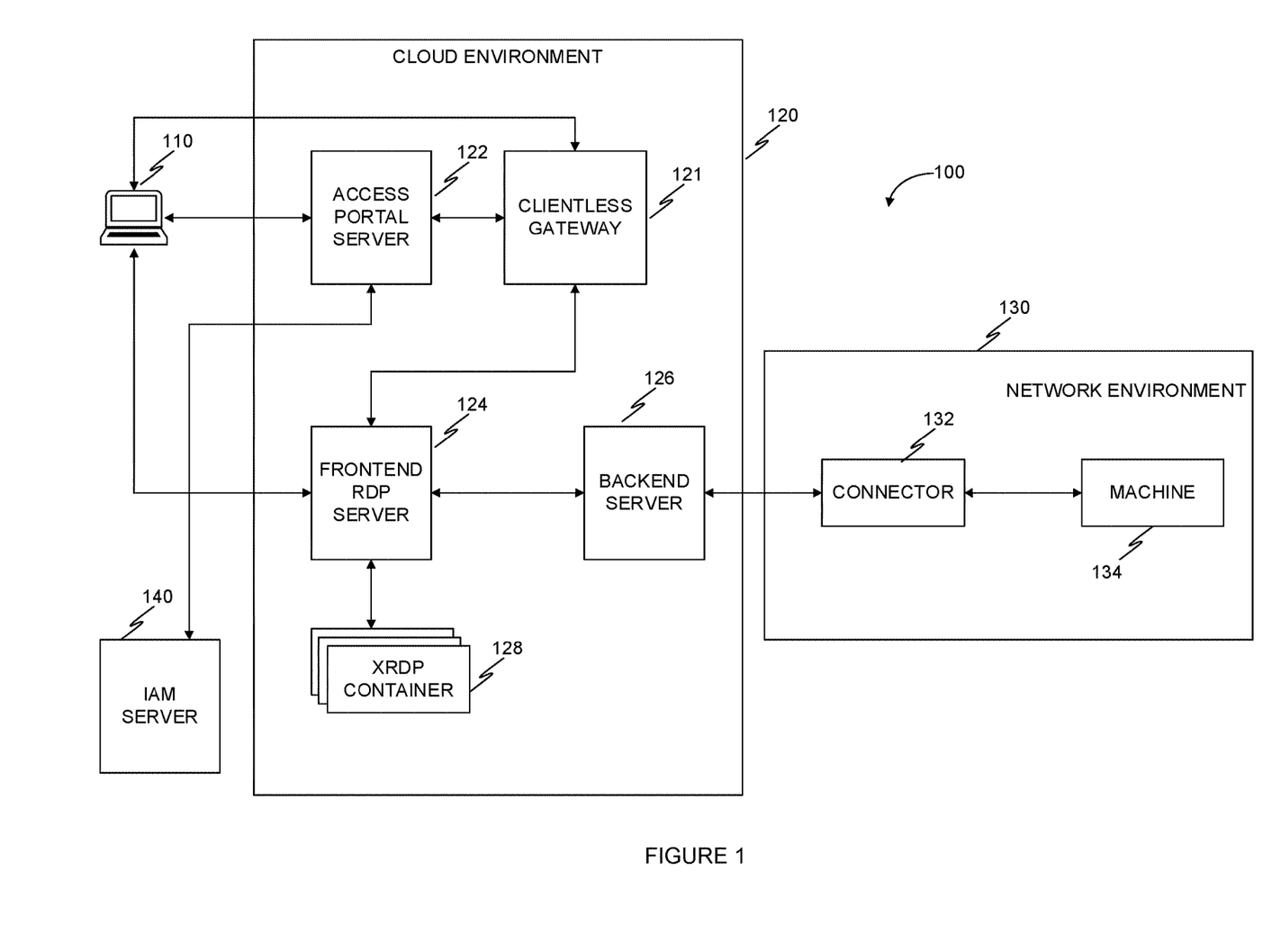
FIG. 1 is a network diagram of a zero trust network architecture for providing an RDP service, implemented in accordance with an embodiment.

FIG. 1 is a network diagram 100 of a zero trust network architecture for providing an RDP service, implemented in accordance with an embodiment. In some embodiments, a remote desktop protocol (RDP) service is a service which connects a client device running an RDP client software to a server running an RDP server software.

In an embodiment, a client device 110 is configured to communicate over a network (not shown) with an access portal server 122, a frontend RDP server 124, and the like, which are implemented (or otherwise deployed) in a first cloud environment 120. In an embodiment, a client device 110 is a personal computer, smart phone, tablet, and the like.

In certain embodiments, the client 110 is configured to deploy an RDP client software. In some embodiments, the client device 110 is configured to access RDP services through a web browser (e.g. utilizing an IIS server). In an embodiment, the first cloud environment 120 is a computing environment configured to provide services utilizing a zero trust architecture.

According to an embodiment, the first cloud environment 120 is implemented on a cloud computing infrastructure, such as Microsoft® Azure, Google® Cloud Platform (GCP), Amazon® Web Services (AWS), a combination thereof, and the like.

In an embodiment, establishing a connection between the client device 110 and the frontend RDP server 124 is performed by an RDP client configured to do the same, or by web based access, as described in more detail below.

In certain embodiments, an RDP client based connection requires an RDP client application, software, and the like, to be executed on the client device 110. For example, in an embodiment, the client device 110 is configured to initiate a connection with the access portal 122.

In some embodiments, the access portal 122 is configured to generate a request for identifying credentials from the client device 110. In an embodiment, the client device 110 is configured to utilize an identity access management (IAM) service, for example from IAM server 140, in order to verify the user account which is requesting access via the client device 110.

In an embodiment, the IAM server 140 is implemented in the first cloud environment 120. In certain embodiments, the client device 110 is configured to provide the access portal server 122 with login credentials, such as username, user account identifier, a password, a passphrase, a token, a cryptographic key, a combination thereof, and the like.

In certain embodiments, the access portal server 122 is configured to provide the client device 110 with an RDP file (e.g., a file having a .rdp extension) which includes therein an address or server name to connect to, a port, a token, a token version, a token type, a combination thereof, and the like. In some embodiments, the RDP file is provided in response to verifying the identity of the user account.

In an embodiment, a token is a unique identifier which is associated with a user account, a tenant, a combination thereof, and the like. In certain embodiments, a token expiry time is predefined. In some embodiments, a token type is a file token, a session token, and the like.

In certain embodiments, the token version indicates an expiry time. For example, token version "2" expires in three hours. In other embodiments, the token is stored, for example in a storage of the frontend RDP server 124, together with a date. The frontend RDP server 124 is configured to determine that a token is expired based on the date, a timestamp, a version, a combination thereof, and the like, according to an embodiment.

For example, in an embodiment, the frontend RDP server 124 includes a policy, access to a policy, and the like, which defines tokens as expired after a predetermined period of time has lapsed. In some embodiments, the predetermined period of time is relative to a last time which the user account was recorded as verified.

In an embodiment, a policy is used to define that where a session is inactive for a predetermined period of time, then the last time a user account was verified is longer than that period of time, and therefore considered no longer valid.

In certain embodiments, where a token is determined to be expired, the frontend RDP server 124 is configured to deny the connection request In some embodiments, the frontend RDP server 124 is configured to direct the session to a designated virtual workload, such as an XRDP container (e.g., container 128).

In an embodiment, the XRDP container 128 is utilized to reauthenticate (or authenticate, if, for example, authentication failed for other reasons) the user credentials. In some embodiments, in response to reauthenticating the user credentials, the frontend RDP server 124 is configured to initiate a reconnect, for example as detailed below.

In an embodiment, the RDP file is generated based on one or more policies which can be stored in a storage (not shown) of the frontend RDP server 124. In other embodiments, the policy is stored on a policy server, implemented as a virtual workload, a physical workload, and the like, in the cloud environment 120. In some embodiments, the RDP file, when read by the client device 110, configures the client device 110 to initiate an RDP session with a frontend server 124.

In an embodiment, a web based connection is initiated by the access portal server 122 between the frontend RDP server 124 and the client device 110. The access portal server 122 is configured to provide the client device 110 with a graphical user interface (GUI), according to an embodiment.

In some embodiments, the GUI is configured to accept an input from the client device 110 to indicate a selection of a machine, an application, and the like, deployed in a secure network environment 130. In some embodiments, the access portal server 122 is configured to request login credentials for the selected RDP application from the client device 110.

In certain embodiments, the GUI includes a selection for applications to which the client device 110 can connect. This is useful in instances where a user of the client device requires access to a certain application on a secure network environment 130, rather than a specific machine on the secure network, wherein the application is configured to run on each of a plurality of machines (e.g., target servers).

In an embodiment based on a web-based connection, discussed in more detail in FIG. 3 below, the client device 110 is configured to provide a selection of a machine from the GUI generated by the access portal server 122, such as machine 134 of the secure network environment 130.

In an embodiment, in response to receiving a selection of the RDP application in the web based GUI and providing valid login credentials, the access portal server 122 is configured to register an RDP session setting in a clientless gateway 121, and is further configured to direct the client device 110 to communicate with the clientless gateway 121.

In some embodiments, the clientless gateway 121 is used to translate the RDP protocol to display over HTTP, thus making it accessible in a web browser client of the client device 110. In an embodiment, the clientless gateway 121 is configured to initiate an RDP connection with the frontend RDP server 124, which in turn is configured to initialize an RDP session with a target server.

Upon connecting the client device 110 to a frontend RDP server 124 utilizing the client RDP application, the frontend RDP server 124 may determine if user credentials are further required. If yes, the frontend RDP server 124 designates a connection to another machine in order to capture login credentials for the designated machine. For example, the frontend server 124 may initiate a container 128 running a Linux OS with an XRDP application. In an embodiment, the frontend server 124 may instruct a serverless function to spin up an XRDP container for each login instance of a user.

The XRDP container 124 provides an isolated environment for each user, in which login credentials of the user may be captured. The login credentials may include a username and password of the machine which the user wishes to connect to, username and password for a domain, authentication token, etc. The XRDP container 124 may be used for other interactions with the client device 110, and may be used to improve user experience by providing and requesting additional information, rendering information pages, and the like.

In an embodiment, the XRDP container 124 may provide a user with a browser client and directed to a web page rendered by the access portal server 122 which provides a form in which to enter the login credentials. The access portal server 122 may provide the login credentials to the frontend server 124 which may use the login credentials to determine if the user is authorized to log in to the machine, which is the target RDP server (i.e. the machine to which the client wishes to connect to). In an embodiment the login credentials may be operating system (e.g. Microsoft Windows®) credentials, which may be different than credentials used for authentication with the zero trust cloud environment 120. In certain embodiments, the zero trust cloud environment 120 may store login credentials, which the zero trust cloud environment 120 may encrypt, in order to use the login credentials for future sessions, thus reducing the need for capturing login details, for example by using the XRDP container. The login credentials may be stored for example by the frontend RDP server 124 in a storage device (not shown).

In some embodiments, a static set of credentials (e.g. username, password, domain, or combination thereof) is stored in the zero trust cloud environment, utilized for any user that has access (for example based on a policy) to a configured RDP application. The user selects the RDP application from the access portal server GUI, then a client device thereof executes the .rdp file. The frontend RDP server 124 uses the static set of credentials without revealing them to the user, and connects the user to the target server. This is advantageous for example to allow third parties access a specific RDP resource within the secure network without generating, or revealing, a dedicated windows user which is configured in the secure network active directory.

For example, a backend server 126 may communicate with a connector 132, which is implemented in the secure network environment 130 of the machine 134. The secure network environment 130 may be a secure network into which it is desired to provide controlled access to certain machines. The connector 132 communicates with a machine 134, which a user device is attempting to access. In an embodiment, a plurality of connectors, each deployed in a secure network environment, each communicate with one of a plurality of backend servers.

In response to determining that the login credentials allow the user device 110 to connect to the machine 134, the frontend server 124 injects a reconnect packet to the communication session between the user device 110 and the XRDP container 128. The reconnect packet configures the user device 110 to end the current RDP session between the client device and the XRDP container, and reconnect with a new session token to the frontend server 124. The frontend server 124 uses the login credentials provided by the client device 110 to the XRDP container 128 in order to access the machine 134.

The communication path between the user device 110 and machine 134 includes the frontend server 124, the backend server 126, and connector 132. In an embodiment a first token (authentication token) may be used for authenticating the client with the frontend RDP server 124 via the access portal server 122, and a second token (session token) may be used for connecting the client device 110 to the frontend RDP server 124 when providing a connection to the target RDP server (i.e. machine 134).

RDP is generally a protocol which does not support an entity in the middle of communication. However, by utilizing the zero trust cloud architecture described herein the client device is able to access a resource, in this case machine 134 in the secure network environment 130, while the connection is monitored, authenticated and verified by the first cloud environment 120. Such capabilities are not native to RDP and may be advantageous to have. Moreover, various forms of functionality can be implemented on top of this architecture to provide additional benefits for such a controlled access environment.

Figure 2:
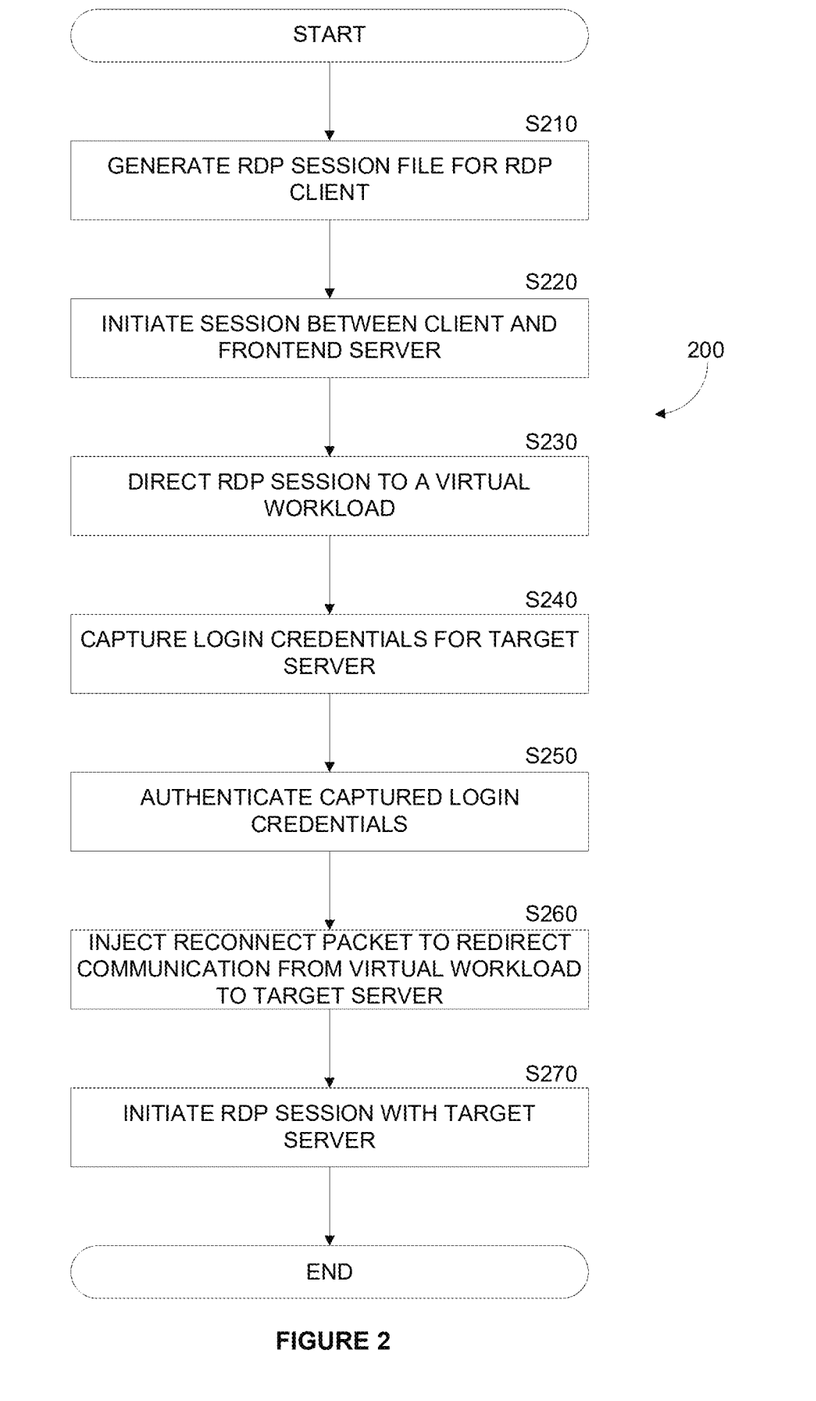
FIG. 2 is a flowchart of a method for an RDP client based connection between a client device and a server utilizing RDP through a zero trust environment, implemented in accordance with an embodiment.

FIG. 2 is a flowchart 200 of a method for an RDP client based connection between a client device and a server utilizing RDP through a zero trust environment, implemented in accordance with an embodiment.

At S210, an RDP session file is generated for a client. The RDP session file may be a textual file which includes information which can be extracted by the client device, having an RDP client. The extracted information allows the RDP client to initiate an RDP session with an RDP frontend server. The extracted information may be, for example, a server name, server address, network path, port, token, token version, token type, expiry, etc.

In an embodiment the RDP session file is generated based on a request initiated by the client device to connect to a remote machine (i.e. target server) in a secure network environment through an intermediary cloud environment (such as cloud environment 120).

At S220, a zero trust RDP session is initiated between the RDP client and an RDP frontend server, utilizing the RDP session file. The RDP session file may designate a target machine. In an embodiment the RDP client may render a user interface on the client device to capture login details of the target machine.

At S230, a virtual workload is spun up, to which the zero trust RDP session is directed. In an embodiment, the virtual workload is implemented as a container, for example utilizing XRDP. Directing the zero trust RDP session to an XRDP container may include generating an instruction for the frontend RDP server to forward network traffic from the client device to the XRDP container, and forward network traffic from the XRDP container to the client device.

At S240, user login credentials are captured, which are used for verification of a user identification with a target server. In an embodiment, the virtual workload may execute a web browser, which is predefined to access a URL directed to an access portal server. The access portal server provides the web browser with a web page which is used to capture login credentials.

At S250, the captured user login credentials are used to authenticate with a remote machine (i.e. target server). The user login credentials may be sent from the XRDP container to the frontend RDP server, which in turn validates them against the target server through a connection established by the backend server and connector. Thus, the frontend server is able to comply with the network level authentication (NLA) requirement of the RDP protocol.

At S260, a reconnect packet is injected in the communication to the client device. The reconnect packet instructs the client device to reconnect to the frontend RDP server with a new session, the new session directed to the target server, whereas the previous session was directed to the XRDP container (i.e. virtual workload). In an embodiment the reconnect packet is an instruction sent to the client device to close the current RDP connection and initiate a new connection immediately with updated information, the updated information including the target server, which replaces the XRDP container. In certain embodiments the updated information of the reconnect packet may further include an updated token which indicates to the frontend RDP server that the client device has provided login credentials which were successfully used to connect to the target server. The reconnect packet may be implemented as a RDP_SERVER_REDIRECTION_PACKET packet in RDP protocol.

At S270, an RDP session is initiated with the target server. The frontend RDP server is able to monitor the communication between the client device and the target server, as communication is passed between the target server and the client device via the frontend RDP server.

The frontend RDP server thus provides the client device with an RDP session to the target server, with the frontend RDP acting as a proxy. Providing an RDP session in this manner allows the frontend RDP server to authenticate the user of the client device (as implicated by the zero trust environment) and also allows the frontend RDP server to monitor communication between the client device and the target server, since all communication flows from the client device to the frontend RDP server, and from there to the target server via the backend server and connector. This method overcomes the restriction placed by NLA, which is that authentication is done prior to establishing a session with the target server. The frontend RDP server is able to impersonate the client device (since it has the login credentials of the client), and thus can read any data packet transferred in the communication line.

Figure 3:
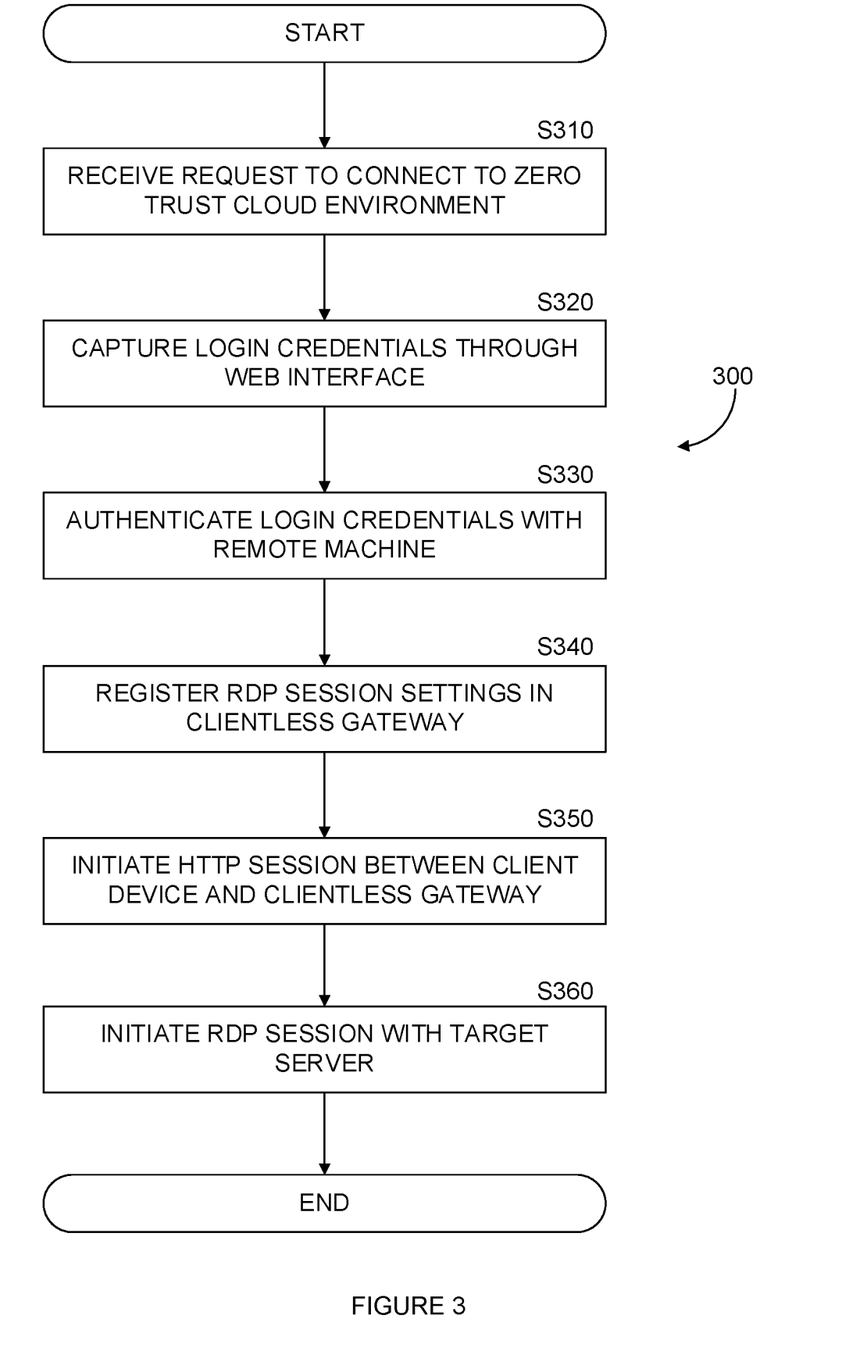
FIG. 3 is a flowchart of a method for web based connection between a client device and a target server utilizing RDP through a zero trust environment, implemented in accordance with an embodiment.

FIG. 3 is a flowchart of a method for web based connection between a client device and a target server utilizing RDP through a zero trust environment, implemented in accordance with an embodiment.

In certain embodiments it may be advantageous to initiate the RDP session between the client device and the remote machine over HTTP, i.e. using a web browser. In such embodiments, the intermediary cloud environment (i.e. cloud environment 120) may allow a user to log in through a GUI of the intermediary cloud environment and request a connection to a remote machine. The GUI may be provided by an access portal server. For example the access portal server may provide the client device with a GUI through the web browser in which a user may provide login credentials. Authentication occurs, and the RDP session is presented in the browser. For example, Apache Guacamole may be utilized to translate between RDP and HTTP protocols. This may be implemented when a user is using a user device which does not have an RDP client installed, or when a device such as a mobile smartphone, which does not support RDP client application installation, is used to log in to a secure environment.

At S310, a request is received to connect to a zero trust cloud environment. The request may be received through an access portal server from a client device, wherein the access portal server generates instructions to render a graphical user interface (GUI) for identity verification. In an embodiment the GUI may further include, in response to successfully completing identity verification, an interface through which a user can provide a selection from one or more target machines to which to initiate an RDP session.

At S320, user login credentials are captured, which are used for verification of a user identification with a target server. The login credentials may be captured by rendering a GUI for the client device, displayed as a webpage which allows the user to fill in login credentials, such as username, password, and the like.

At S330, the captured user login credentials are used to authenticate with a remote machine (i.e. target server). The user login credentials may be sent from the access portal server to the frontend RDP server, which in turn provides them to the backend server in order to initiate an RDP session with the target server through the connector, which is implemented in the target server's computing environment.

At S340, an RDP session setting is registered in a clientless gateway. In an embodiment session settings are registered in response to receiving a selection of an RDP application in a web based GUI and providing valid login credentials. The RDP session settings are registered by the access portal server.

At S350, an HTTP connection is established between the client device and a clientless gateway. In an embodiment, the clientless gateway is implemented, for example, as Apache® Guacamole. The clientless gateway is used to translate the RDP protocol to display over HTTP, thus making it accessible in a web browser client of the client device. The clientless gateway initiates an RDP connection with the frontend RDP server, which initializes an RDP session with the target server.

At S360, an RDP session is initiated with the target server. The RDP session may be initiated by the frontend RDP server, using the captured login credentials. The client device sends data packets over HTTP to the clientless gateway (e.g. Guacamole), which translates the HTTP format to an RDP session to the frontend RDP server, which sends the data packet through the backend server and connector to the target server.

Figure 4:
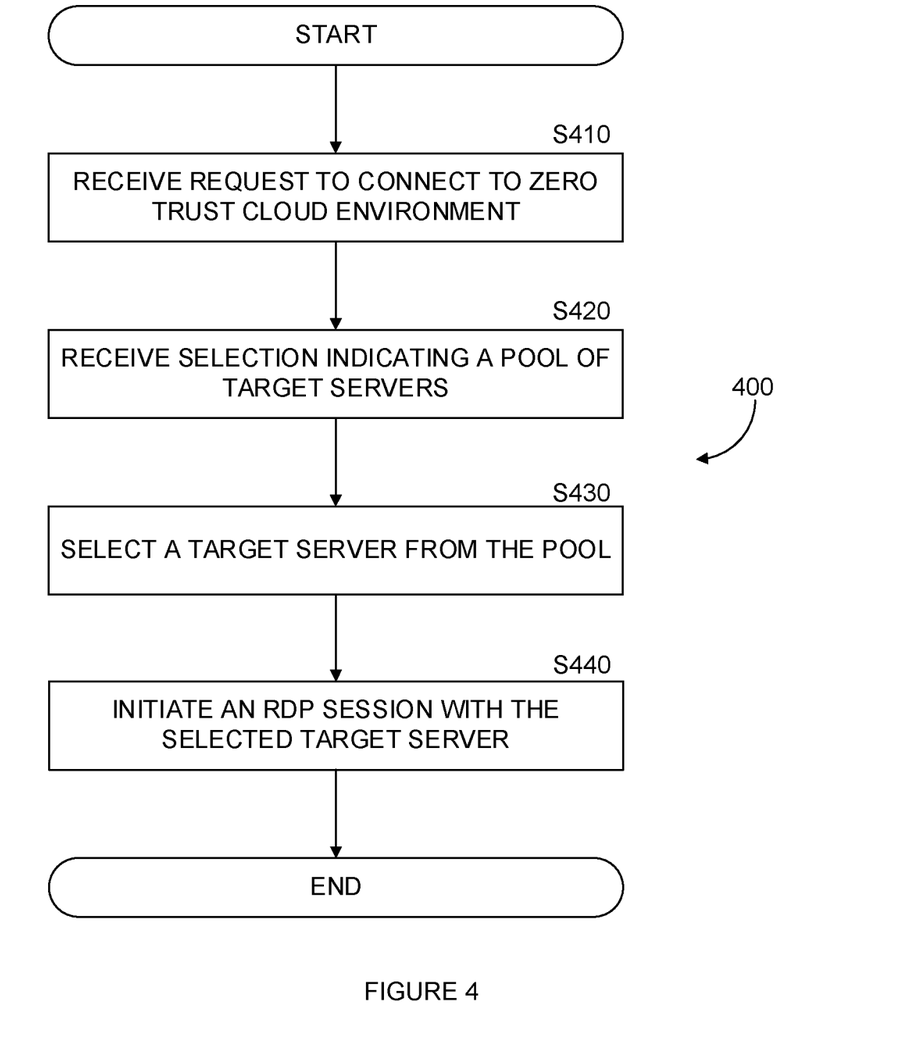
FIG. 4 is a flowchart of a method for providing a client device access to an RDP server pool, implemented in accordance with an embodiment.

FIG. 4 is a flowchart of a method for providing a client device access to an RDP server pool, implemented in accordance with an embodiment. Providing access to an RDP server pool may be advantageous for example in situations where the user is not necessarily interested in a specific machine, as much as they are interested in logging in to a particular network, or accessing an application which may be available on any one of many such machines.

At S410 a request is received to connect to a zero trust cloud environment. The request may be received through an access portal server from a client device, wherein the access portal server generates instructions to render a graphical user interface (GUI) for identity verification. In an embodiment the GUI may further include, in response to successfully completing identity verification, an interface through which a user can provide a selection from a group of target servers to which to initiate an RDP session.

At S420 a selection is received which indicates a group of target servers. In an embodiment, a GUI may represent a group of target servers, for example by rendering an icon which names a specific application executed on top of each of the target servers. By selecting the icon, for example by clicking on it, the user indicates that they wish to access the application hosted on any of the target servers. The group of target servers may also be referred to as a server pool, and in the case of RDP servers, an RDP server pool.

At S430 a target server is selected from the group of target servers. In an embodiment selection may be performed by the access portal server, the frontend RDP server, or a load balancer implemented in the zero trust cloud environment.

At S440 an RDP session is with the selected target server. The RDP session may be initiated for example utilizing the RDP client application-based method described above with respect to FIG. 2, or the web based method described above with respect to FIG. 3.

Figure 5:
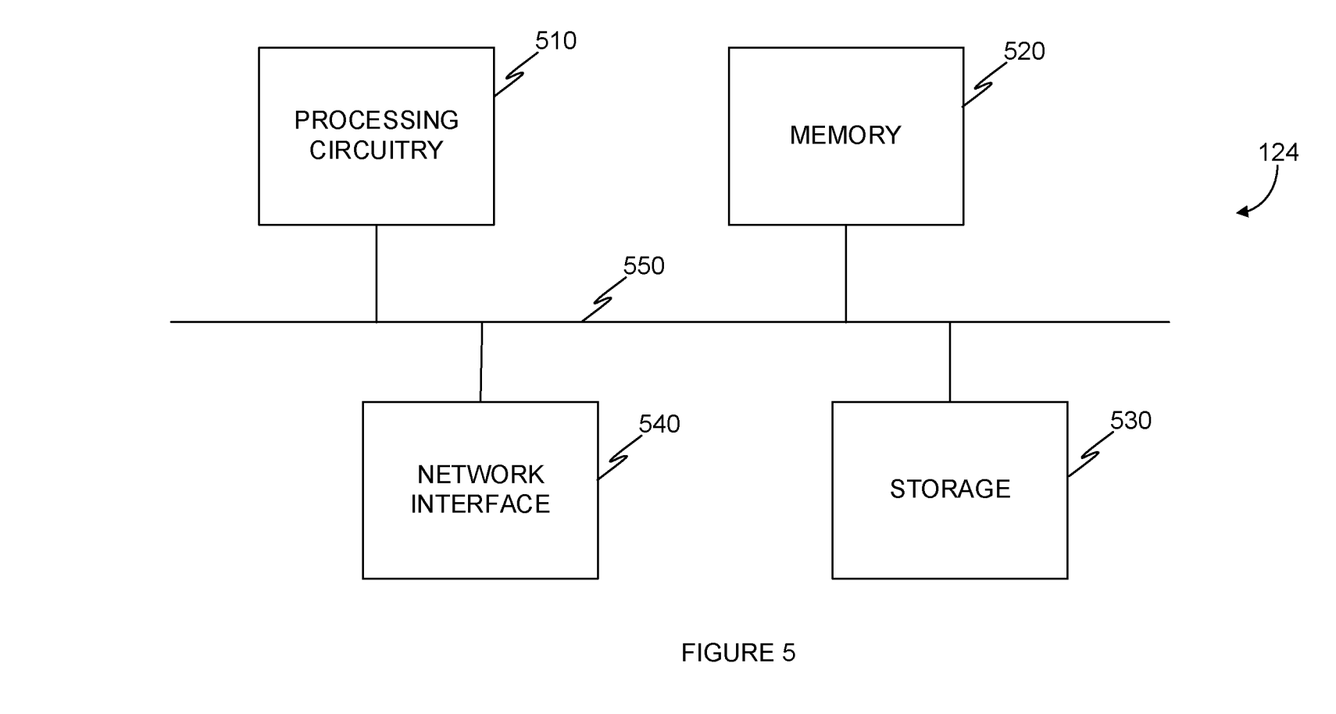
FIG. 5 is an example schematic diagram of a frontend RDP server, implemented according to an embodiment.

FIG. 5 is an example schematic diagram of a frontend RDP server 124, implemented according to an embodiment. The frontend RDP server 124 includes a processing circuitry 510 coupled to a memory 520, a storage 530, and a network interface 540. In an embodiment, the components of the frontend RDP server 124 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, solid state storage, and the like, and may be realized, for example, as flash memory or other memory technology, or any other medium which can be used to store the desired information.

The network interface 540 allows the frontend RDP server 124 to communicate with, for example, client device 110, the access portal server 122, the clientless gateway 121, backend server 126, connector 123, or any combination thereof.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A client-based method for connecting a client device to a remote desktop protocol (RDP) server through a zero trust cloud environment, comprising:

receiving a request based on a user account to connect to a zero trust cloud environment;

verifying an identity of the user account, the user account utilized by a client device;

initiating a first RDP session between the client device and a frontend RDP server of the zero trust cloud environment, wherein the frontend RDP server is configured to direct data received from the client device to a virtual workload;

capturing through the virtual workload login credentials from the client device, wherein the login credentials are for a target server deployed in a secure network environment;

authenticating the captured login credentials with the target server; and in response to determining that the captured login information is authenticated by the target server, sending the client device a reconnect instruction, which when executed by the client device configures the client device to reconnect to the frontend RDP server.

2. The method of claim 1, further comprising:
receiving a communication from the client device; and
directing the communication to the target server.

3. The method of claim 2, further comprising:
receiving a response to the communication from the target server; and
directing the response to the client device.

4. The method of claim 1, further comprising:
configuring the virtual workload to initiate a browser session, wherein the browser session is directed to a webpage generated by an access portal server; and
capturing the login credentials from the generated webpage.

5. The method of claim 1, further comprising:
generating an RDP session file for the client device, wherein the RDP session file includes an identifier of the target server.

6. The method of claim 1, further comprising:
monitoring communication between the client device and the target server.

7. The method of claim 6, further comprising:
reading a data packet transferred in the communication between the client device and the target server.

8. The method of claim 1, wherein the virtual workload is an XRDP container.

9. The method of claim 1, further comprising:
configuring the client device to execute an RDP client software program.

10. The method of claim 1, wherein the zero trust cloud environment includes any one of: an access portal server, the virtual workload, a backend server, or any combination thereof.

11. The method of claim 10, wherein the backend server is configured to connect to a connector deployed in the secure network environment.

12. A non-transitory computer-readable medium storing a set of instructions for connecting a client device to remote desktop protocol (RDP) server through a zero trust cloud environment, the set of instructions comprising:
one or more instructions that, when executed by one or more processors of a device, cause the device to:
receive a request based on a user account to connect to a zero trust cloud environment;
verify an identity of the user account, the user account utilized by a client device;
initiate a first RDP session between the client device and a frontend RDP server of the zero trust cloud environment, wherein the frontend RDP server is configured to direct data received from the client device to a virtual workload;
capture through the virtual workload login credentials from the client device, wherein the login credentials are for a target server deployed in a secure network environment;
authenticate the captured login credentials with the target server; and
in response to determining that the captured login information is authenticated by the target server, send the client device a reconnect instruction, which when executed by the client device configures the client device to reconnect to the frontend RDP server.

13. A system for connecting a client device to a remote desktop protocol (RDP) server through a zero trust cloud environment comprising:
a processing circuitry; and
a memory, the memory containing instructions that, when executed by the processing circuitry, configure the system to:
receive a request based on a user account to connect to a zero trust cloud environment;
verify an identity of the user account, the user account utilized by a client device;
initiate a first RDP session between the client device and a frontend RDP server of the zero trust cloud environment, wherein the frontend RDP server is configured to direct data received from the client device to a virtual workload;
capture through the virtual workload login credentials from the client device, wherein the login credentials are for a target server deployed in a secure network environment;
authenticate the captured login credentials with the target server; and
in response to determining that the captured login information is authenticated by the target server, send the client device a reconnect instruction, which when executed by the client device configures the client device to reconnect to the frontend RDP server.

14. The system of claim 13, wherein the memory contains further instructions which when executed by the processing circuitry further configure the system to:
receive a communication from the client device; and
direct the communication to the target server.

15. The system of claim 14, wherein the memory contains further instructions which when executed by the processing circuitry further configure the system to:
receive a response to the communication from the target server; and
direct the response to the client device.

16. The system of claim 13, wherein the memory contains further instructions which when executed by the processing circuitry further configure the system to:
configure the virtual workload to initiate a browser session, wherein the browser session is directed to a webpage generated by an access portal server; and
capture the login credentials from the generated webpage.

17. The system of claim 13, wherein the memory contains further instructions which when executed by the processing circuitry further configure the system to:
generate an RDP session file for the client device, wherein the RDP session file includes an identifier of the target server.

18. The system of claim 13, wherein the memory contains further instructions which when executed by the processing circuitry further configure the system to:
monitor communication between the client device and the target server.

19. The system of claim 18, wherein the memory contains further instructions which when executed by the processing circuitry further configure the system to:
read a data packet transferred in the communication between the client device and the target server.

20. The system of claim 13, wherein the virtual workload is an XRDP container.

21. The system of claim 13, wherein the memory contains further instructions which when executed by the processing circuitry further configure the system to:

configure the client device to execute an RDP client software program.

22. The system of claim 13, wherein the zero trust cloud environment includes any one of: an access portal server, the virtual workload, a backend server, or any combination thereof.

23. The system of claim 22, wherein the backend server is configured to connect to a connector deployed in the secure network environment.

* * * * *